Patented Feb. 25, 1941

2,232,806

UNITED STATES PATENT OFFICE 2,232,806

LAMINATED SAFETY GLASS

Joseph D. Ryan, Toledo, Ohio, assignor to Libbey-Owens-Ford Glass Company, Toledo, Ohio, a corporation of Ohio No Drawing. Application May 3, 1937, Serial No. 140,428

10 Claims. (Cl. 49—92)

The present invention relates to plasticization of polyvinyl acetal resins and also to the use of the resulting plastics as an interlayer in laminated safety glass. Claims to laminated safety glass structures involving the use of my improved plastics are contained in the present application, while claims to the plastics per se are being made in a divisional application, now Patent No. 2,124,315.

The polyvinyl acetal resins may be formed by reacting an aldehyde with either a completely or partially hydrolyzed polyvinyl ester. These resins can be produced in various ways, the general practice being to employ polyvinyl acetate and to then either partially or completely hydrolyze the same; partially hydrolyzed polyvinyl acetate being formed when the resultant product contains acetyl groups, and polyvinyl alcohol resulting when the polyvinyl acetate is completely hydrolyzed. Either of these two substances can then be reacted with an aldehyde, usually in the presence of a mineral acid catalyst, to give a condensation product termed "polyvinyl acetal resin."

It will be understood that various techniques or processes can be employed in getting the ultimate polyvinyl acetal resin and that this invention is not in any way concerned with the particular method or methods employed in the production of the raw resin. It may be well to point out, however, that the molecules of both the partially hydrolyzed polyvinyl acetate and the polyvinyl alcohol contain vinyl alcohol groups, and during the reaction step with the aldehyde, the aldehyde condenses with some of the vinyl alcohol groups present, resulting in the polyvinyl acetal resin formation. Most of my plasticization work in connection with the present invention has been carried on using polyvinyl resins in which formaldehyde, butyraldehyde, and acetaldehyde, have been employed, although it has been my observation that polyvinyl acetal resins made by the use of higher molecular weight aldehydes, such as heptaldehyde, octaldehyde, benzaldehyde, etc., resemble the butyraldehyde resin in their plasticization characteristics.

The extent of reaction of the aldehyde with the vinyl alcohol groups present in the molecules of the polyvinyl alcohol or the partially hydrolyzed polyvinyl acetate has a bearing not only on the yield of polyvinyl acetal resin from the mix, but the degree of condensation must proceed beyond a certain point to give a polyvinyl acetal resin which is not unduly susceptible to water. Polyvinyl acetal resins, not unduly susceptible to water, can be formed using the aldehydes above set forth when condensation with the polyvinyl alcohol or partially hydrolyzed polyvinyl acetate is carried to a point where at least 65 to 70 percent of the alcohol groups present have reacted with the aldehyde.

In the manufacture of laminated safety glass for example, it is preferable to employ a plastic interlayer that is not particularly water or moisture susceptible, thus avoiding the problem of protecting the marginal portions of the laminated safety glass with a weather-proof seal. In other fields of use, polyvinyl acetal resins may, under some circumstances, be satisfactory even though they be somewhat susceptible to the action of water.

The present invention is primarily concerned with the preparation of plastics from the polyvinyl acetal resins by incorporating a plasticizer or plasticizer mixture with the resin in suitable amounts to give a plastic capable of satisfactory service in its intended use. Polyvinyl acetal resins are today available on the open market and there are known plasticizers for such resins. For example, the esters of phthalic acid, the toluene sulfonamids, the higher esters of the glycols or polyglycols, are some of the well known plasticizers for these materials. However, some of these known plasticizers for this type of resin impair or completely destroy the desirable latent properties of the resin while other known plasticizers give only fair results. I have found that by using specially designed and prepared plasticizers, extremely satisfactory plastics can be made from the polyvinyl acetal resins which are unusually well suited for employment in the laminated safety glass field. Considering the large number of plasticizers now marketed in substantial quantities, it is surprising that of the hundreds of plasticizers studied and tested, so many were found unsuitable, especially for plastics to be employed in the manufacture of laminated safety glass. However, as will appear hereinafter, there must of necessity be a large number of rigid stipulations placed on a material to be used as a plasticizer for these resins, and it thus becomes obvious that to find or to prepare a plasticizer having all of these essential characteristics is far from a simple matter, and in fact this resulted in extensive study on my part of new materials most of which were not commercially available at the time I commenced my research work on this subject.

Where the resin is to serve as the plastic interlayer in safety glass, it must be stable to heat and light energy and must have a sufficiently high boiling point and low vapor pressure that the plastic will not bubble or be otherwise unstable when subjected to the varying temperatures encountered in normal use. As has already been mentioned, if laminated safety glass is made from the resin and no edge seal is used to protect the resin, the plasticizer as well as the resin must show adequate resistance to hydrolysis under the conditions of normal usage. The plasticizer must be such that the plastic made therewith, when bonded between glass sheets, will exhibit sufficient resistance to impact at varying temperatures (normally high, medium, and low temperatures as within a range from about 0° F. to 120° F.). As a further consideration, the plasticizer must not so affect the resin that the interlayer formed therefrom will be too soft at the higher range of temperatures or too brittle at the lower range of temperatures.

To be satisfactory, the plasticizer must be such that it will not unduly exude or sweat out from the plastic and certainly must not in any way adversely interfere with the adhesion of the plastic layer to the glass, whether the plastic be bonded directly to the glass or through the intermediary of an adhesive material. The properties of the plasticizer must be such that slight variations in the ratio of plasticizer to resin, which normally exist as a result of the plastic manufacture and subsequent storage thereof before use, will not seriously affect the breaking strength of the laminated safety glass at the varying temperatures to which it is exposed. Also, the plasticizer must be suitably compatible with the resin so that it will not interfere with clarity and transparency of the resin plastic.

Of course, there are other fields of use for these resins which may not require such a selective choice of plasticizer content, but it is thought to be obvious that best results will be obtained when using proper plasticizing agents whether the resins are used in safety glass or elsewhere.

I have been experimenting with plasticizers for the polyvinyl acetal resins over a period of years. In fact, I have endeavored to approach plasticizer developments not in a haphazard, hit and miss way, but rather by careful and well thought out research program. As previously mentioned and for one reason or another, all of the common commercially available plasticizers fail to meet the rigid requirements stipulated above, and it was therefore found necessary to begin the preparation of a new series of materials designed especially for plasticization of the polyvinyl acetal resins. On the basis of practical experimental work, as well as a theoretical analysis of the problem, I concluded that a plasticizer of long carbon chain configuration should be the preferred type of plasticizer. I was influenced in part in this attempt to produce a long straight chain plasticizer by the long chain characteristics of the polyvinyl acetal resins themselves. So far as I know, there was no previous work done or published to indicate whether this was a proper approach to the problem or not, but it was decided that because of the structure of the resin itself, a plasticizer having a similar structure should be well suited as compared to the other plasticizers previously tried and lacking in this general characteristic.

Having first decided to develop a plasticizer having a long carbon chain configuration, it was then necessary to give consideration to the kind of materials that might possibly serve in the production of such plasticizers, and I elected to experiment with the straight chain dicarboxylic acids by producing esters therefrom and then utilizing these esters as plasticizers.

Discouraging results were at first encountered with the esters of the dicarboxylic acids as plasticizers for the polyvinyl acetal resins. Extensive work, however, in face of these discouraging results, showed that not all of the dicarboxylic acids have a sufficiently long chain structure to give the benefits sought after. For example, the oxalic, malic, succinic, and glutaric acid esters were prepared and tested and found to be lacking in suitable properties. After a great deal of detail experimental work and testing, I concluded that although these were straight chain dicarboxylic acids, they did not include a sufficient number of methylene groups or, stated differently, the chain was not long enough. It was not until the esters of adipic acid were prepared and tested that outstandingly satisfactory results were realized.

The general formula for these straight chain dicarboxylic acids may be written as follows:

$$\text{HOOC}-(\text{CH}_2)_x-\text{COOH}$$

For oxalic acid ---------------------- $x$ equals 0
For malonic acid -------------------- $x$ equals 1
For succinic acid -------------------- $x$ equals 2
For glutaric acid -------------------- $x$ equals 3
For adipic acid --------------------- $x$ equals 4
For pimelic acid -------------------- $x$ equals 5
For suberic acid -------------------- $x$ equals 6
For azelaic acid -------------------- $x$ equals 7
For sebacic acid -------------------- $x$ equals 8
For nonanedicarboxylic acid -------- $x$ equals 9
For decamethylene dicarboxylic acid - $x$ equals 10
For brassylic acid ------------------ $x$ equals 11
For dodecamethylene dicarboxylic acid ---------------------------- $x$ equals 12

Based on the work done, I am satisfied that the members of the series of straight chain dicarboxylic acids containing less than four methylene groups are unsatisfactory for the plasticization of the polyvinyl acetal resins. I have likewise established that esters of the straight chain dicarboxylic acids containing four or more methylene groups are preeminently suited for plasticization of the polyvinyl acetal resins. Inasmuch as most of these acids are not available on the open market, and especially as I wanted to be sure of the purity of the plasticizers produced, I prepared most of my own acids and then produced the esters from such acids.

To illustrate methods of preparing the acids, any one of the several methods outlined below can and has been used in preparing the acids:

(1) By oxidation of a straight chain glycol or hydroxy mono carboxylic acid to the corresponding dicarboxylic acid. This method was found to be especially suited for the lowest members of the series. For example, in the case of adipic acid, good yields were obtained by resorting to the oxidation of cyclohexanol.

(2) By electrolysis of the monoester mono alkali salt of a dicarboxylic acid. To illustrate, a monoalkyl ester of potassium adipate was successfully electrolyzed to yield sebacic acid esters.

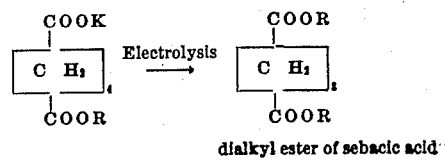

dialkyl ester of sebacic acid (3) By reduction of the dialkyl ester of a straight chain dicarboxylic acid ester with metallic sodium to the corresponding glycol, replacement of the hydroxyl groups of the glycol with halogen, substitution of the halogen by cyano groups followed by hydrolysis. By following this method, a dicarboxylic acid, having two more carbon atoms than the parent dicarboxylic acid, is obtained. For example, starting with dibutyl sebacate, I obtained decamethylene dicarboxylic acids in good yields as follows:

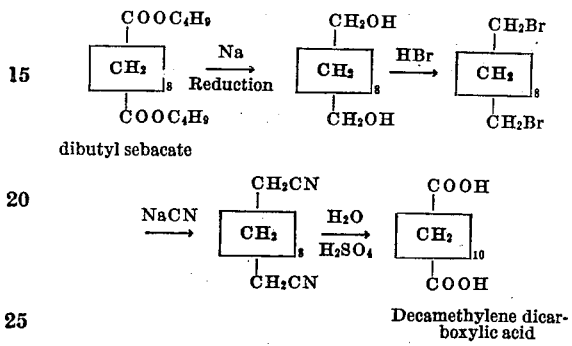

dibutyl sebacate

Decamethylene dicarboxylic acid

I found the latter two methods especially suited for the preparation of the higher molecular weight dicarboxylic acids.

Esterification of these dicarboxylic acids does not offer any particular problem. To prepare the esters, the acid is mixed with the desired monohydric alcohol which was previously saturated with dry hydrogen chloride gas and the mixture refluxed for several hours. The ester so formed was then purified by washing, drying, and vacuum distillation. In some cases it was found possible to obtain good yields of a satisfactory product by simple fractionation of the refluxed reaction mixture. My observation indicates that the esters so formed are highly stable compounds which are resistant to hydrolysis and stable to heat and light energy.

The most common forms of commercially available polyvinyl acetal resins, as previously stated, are those made with formaldehyde, acetaldehyde, or butyraldehyde. The polyvinyl acetal resin made with formaldehyde in the reaction step has been found, as might be expected, to be anomalous in its plasticization behavior to the polyvinyl acetal resin made with higher molecular weight aldehydes. Stated differently, thus far in my development work, I have found that any material suitable as a plasticizer for the polyvinyl acetal resin made using formaldehyde will likewise plasticize the polyvinyl acetal resins made using acetaldehyde, butyraldehyde, and other higher molecular weight aldehydes, but many of the plasticizers for the latter mentioned polyvinyl acetal resins will not give suitable results as plasticizers for the formaldehyde type of resin.

I have prepared some esters of the straight chain dicarboxylic acids which will plasticize equally well the formaldehyde polyvinyl acetal resin or the other types of polyvinyl acetal resins but, on the other hand, some of the ester plasticizers produced from these long chain acids are incompatible with the formaldehyde type of resin unless blended with other wholly compatible plasticizers such as the dimethyl and diethyl esters of phthalic acid. Certain of the other esters of the dicarboxylic acids have not been successfully used alone, and further I have not found suitable blending plasticizers to make them compatible with the formaldehyde type of polyvinyl acetal resin.

The dimethyl and diethyl esters of the straight chain dicarboxylic acids, having four to six methylene groups, can be used as the sole plasticizer for the polyvinyl acetal resin made using formaldehyde, yielding clear, tough, transparent masses. On the other hand, the dimethyl and diethyl esters of the dicarboxylic acids, having more than six methylene groups, must be blended with a wholly compatible plasticizer for this resin, dimethyl and diethyl phthalates being capable of use in this connection. The proportions of phthalate esters which must be added to obtain clear, tough, resinous plastics vary somewhat, but in general an equal mixture works satisfactorily.

Likewise, I have found that when this series of acids is esterified with higher molecular weight monohydric alkyl alcohols, such as propyl, butyl, amyl, etc., the resultant compounds are not compatible with the formaldehyde type resin except in very small proportions, and in fact in such small proportion that the resultant plastic masses are not greatly superior to the resin plasticized with phthalate esters alone. Further, my work has shown that when this series of acids is esterified with more complex alcohols containing ether groups, such as monomethyl and monoethyl ethers of ethylene glycol, the resulting plasticizers are entirely compatible with the polyvinyl acetal resins produced using formaldehyde. This unexpected compatibility may be explained by the solvent action contributed to the plasticizer molecule by the addition of the two ether groups.

In general practice where the plastics are to be subjected to varying temperatures and particularly the higher temperatures, I prefer to use esters of the dicarboxylic acids containing more than four of the methylene groups, because as the number of methylene groups in the acid is increased above four, the boiling points of the resultant esters are increased progressively, accompanied of course by a progressive reduction in the vapor pressure of the plasticizers.

As to plasticization of the polyvinyl acetal resins made using aldehydes having a greater molecular weight than that of formaldehyde, such as acetaldehyde, butyraldehyde, heptaldehyde, octaldehyde, etc., I have found that all the esters made from the monohydric alkyl alcohol, such as methyl, ethyl, propyl, butyl, amyl, and octyl, work satisfactorily as plasticizers. The esters formed from this series of dicarboxylic acids with more complex alcohols, such as alkoxy alkyl alcohols, also work satisfactorily with these resins.

By following the teachings of the invention herein disclosed and as indicated by the data given, a flexible and wide choice of plasticizer selection is made possible. In general, it is obviously desirable to use the acid having the lowest cost and to esterify this with the most inexpensive available alcohol of higher molecular weight. The use of the high molecular weight alcohol reduces the cost of the esterification step and likewise yields an ester plasticizer of higher boiling point and lower vapor pressure, both being sought for properties. Some of the esters of the higher molecular weight acids (especially those containing more than nine methylene groups) were found to be solids, but this change in physical state in no way impaired the efficacy of my results.

As an example of a polyvinyl acetal resin used by me, the following data are given:

Polyvinyl acetate having a viscosity of 15 centipoises in a molar benzene solution at 20° C. was hydrolyzed to the extent of 95%. This partially hydrolyzed polyvinyl acetate was then reacted with formaldehyde in the presence of a catalyst to the point that approximately 90% of the hydroxyl groups present in the molecule were condensed with the aldehyde, giving a resin analyzing as follows:

|   | Per cent |
|---|---|
| Aldehyde combined as polyvinyl acetal | 81.0 |
| Ester as polyvinyl acetate | 10.1 |
| Alcohol as polyvinyl alcohol | 7.2 |

A second resin was used and which was prepared by employing partially hydrolyzed polyvinyl acetate (formed from polyvinyl acetate having a viscosity of 15 centipoises when measured in a molar solution of benzene at 20° C.) and reacted with acetaldehyde under suitable conditions and in the presence of a catalyst. An analysis of the resulting polyvinyl acetal resin showed that the polyvinyl acetate was hydrolyzed to the extent of about 92% and that approximately 88% of the alcohol or hydroxyl groups of the partially hydrolyzed polyvinyl acetate had combined with the acetaldehyde in the finished resin. On analysis, the resin showed:

|   | Per cent |
|---|---|
| Aldehyde combined as polyvinyl acetal | 79.5 |
| Ester as polyvinyl acetate | 11.0 |
| Alcohol as polyvinyl alcohol | 8.1 |

A third resin differed from the two just described not only in aldehyde used, but also by reason of the fact polyvinyl alcohol was employed in lieu of the partially hydrolyzed polyvinyl acetate. The polyvinyl alcohol was produced from polyvinyl acetate which had a viscosity in a molar benzene solution at 20° C. of 25 centipoises. The polyvinyl alcohol was reacted with butyraldehyde under suitable conditions to yield a resin in which the aldehyde had reacted with the alcohol groups available to the extent of about 72%. Analyses of the resin showed:

|   | Per cent |
|---|---|
| Aldehyde combined as polyvinyl acetal | 81.2 |
| Ester as polyvinyl acetate | .57 |
| Alcohol as polyvinyl alcohol | 19.6 |

A great many plastics were made using as plasticizers the acid esters herein disclosed. As representative examples of some of the resin plastics, the following proportions and plasticizers are set forth:

In each of the following ten examples, the resin used was the polyvinyl acetal resin in which formaldehyde was employed in the reaction, and the parts given are by weight:

Example 1

|   | Parts |
|---|---|
| Resin | 100 |
| Dimethyl adipate | 50 |

Example 2

| Resin | 100 |
|---|---|
| Diethyl adipate | 50 |

Example 3

| Resin | 100 |
|---|---|
| Dimethyl suberate | 50 |

Example 4

| Resin | 100 |
|---|---|
| Diethyl suberate | 50 |

Example 5

| Resin | 100 |
|---|---|
| Dimethyl phthalate | 42.5 |
| Dimethyl subacate | 42.5 |

Example 6

| Resin | 100 |
|---|---|
| Dimethyl ester of decamethylene dicarboxylic acid | 50 |
| Dimethyl ester of phthalic acid | 50 |

Example 7

| Resin | 100 |
|---|---|
| Di(monoethyl ether of ethylene glycol) adipate | 50 |

Example 8

| Resin | 100 |
|---|---|
| Di(monoethyl ether of ethylene glycol) suberate | 50 |

Example 9

| Resin | 100 |
|---|---|
| Di(monoethyl ether of ethylene glycol) sebacate | 50 |

Example 10

| Resin | 100 |
|---|---|
| Di(monoethyl ether of ethylene glycol) ester of decamethylene dicarboxylic acid | 60 |

The following examples are given in connection with the polyvinyl acetal resin in which butyraldehyde was employed during the reaction, and the parts specified are by weight:

Example 11

|   | Parts |
|---|---|
| Resin | 100 |
| Dimethyl adipate | 50 |

Example 12

| Resin | 100 |
|---|---|
| Diethyl adipate | 50 |

Example 13

| Resin | 100 |
|---|---|
| Dibutyl adipate | 50 |

Example 14

| Resin | 100 |
|---|---|
| Dimethyl suberate | 50 |

Example 15

| Resin | 100 |
|---|---|
| Diethyl suberate | 50 |

Example 16

| Resin | 100 |
|---|---|
| Dibutyl suberate | 50 |

Example 17

| Resin | 100 |
|---|---|
| Diamyl suberate | 50 |

Example 18

| Resin | 100 |
|---|---|
| Dimethyl sebacate | 50 |

Example 19

| Resin | 100 |
|---|---|
| Diethyl sebacate | 50 |

Example 20

| Resin | 100 |
|---|---|
| Dibutyl sebacate | 50 |

Example 21

| | |
|---|---|
| Resin | 100 |
| Di(monoethyl ether of ethylene glycol) sebacate | 50 |

Example 22

| | |
|---|---|
| Resin | 100 |
| Dimethyl ester of decamethylene dicarboxlic acid | 50 |

Example 23

| | |
|---|---|
| Resin | 100 |
| Diethyl ester of decamethylene dicarboxylic acid | 50 |

Example 24

| | |
|---|---|
| Resin | 100 |
| Dibutyl ester of decamethylene dicarboxylic acid | 50 |

The foregoing examples are not a complete list of all plasticizers comprehended by this invention but are sufficient to enable those versed in the art to practice the invention by following the teachings herein set forth.

As representative break test data, the following is given, and in all cases plastic twenty-five thousandths of an inch in thickness was bonded between glass and then tested by supporting the glass around its marginal edges and dropping a two pound steel ball from varying heights to determine the critical distance at the temperatures listed:

The polyvinyl acetal resin involving the use of formaldehyde, when plasticized with 50 parts of dimethyl adipate per 100 parts of resin, had a critical distance at 0° F. of 18 feet; at 70° F. of 21 feet; and at 120° F. of 9 feet. The same resin, when plasticized with 42.5 parts dimethyl phthalate and 42.5 parts dimethyl sebacate per 100 parts of resin, had a critical distance at 0° F. of 16 feet; at 70° F.—21½ feet plus; at 120° F.—11 feet. The same resin, when plasticized with 50 parts of dimethyl ester of decamethylene dicarboxylic acid and 50 parts of dimethyl phthalate per 100 parts of resin, had a critical distance at 0° F. of 10 feet; at 70° F.—21 feet; and at 120° F.—8 feet.

The following resin plastics were made using polyvinyl acetal resin involving butyraldehyde in its formation and when 100 parts of said resin was plasticized with 50 parts of dibutyl adipate, it had a critical distance at 0° F. of 18 feet; at 70° F.—21 feet; and at 120° F.—7 feet. When the resin was plasticized with 50 parts of diamyl suberate per 100 parts of resin, it had a critical distance at 0° F. of 13 feet; at 70° F.—21½ feet plus; and at 120° F.—9 feet. When 100 parts of resin was plasticized with 50 parts of dibutyl sebacate, it had a critical distance at 0° F. of 16 feet; at 70° F.—21½ feet plus; and at 120° F.—8 to 10 feet. When 100 parts of the resin was plasticized with 50 parts of dibutyl ester of decamethylene dicarboxylic acid, it had a critical distance at 0° F. of 14 feet; at 70° F.—21½ feet; and at 120° F.—8 feet.

I claim:

1. Laminated safety glass comprising two sheets of glass and an interlayer of plastic bonded therebetween which comprises a polyvinyl acetal resin formed by the reaction of a saturated aldehyde on a hydrolyzed polyvinl ester in which approximately sixty-five percent of the available hydroxyl groups of said hydrolysis product have been reacted with the aldehyde, and an ester of monohydric alcohol and a straight chain dicarboxylic acid having four or more methylene groups compatible therewith as a plasticizer for said polyvinyl acetal resin.

2. Laminated safety glass comprising two sheets of glass and an interlayer of plastic bonded therebetween which comprises a polyvinyl acetal resin formed by the reaction of a saturated aldehyde on a hydrolyzed polyvinyl ester in which approximately sixty-five percent of the available hydroxyl groups of said hydrolysis product have been reacted with the aldehyde, an ester of monohydric alcohol and a straight chain dicarboxylic acid having four or more methylene groups compatible therewith as a plasticizer for said polyvinyl acetal resin, and a compatible diluent plasticizer therefor.

3. Laminated safety glass comprising two sheets of glass and an interlayer of plastic bonded therebetween which comprises a polyvinyl acetal resin formed by the reaction of a saturated aldehyde on a hydrolyzed polyvinyl ester in which approximately sixty-five percent of the available hydroxyl groups of said hydrolysis product have been reacted with the aldehyde, an ester of monohydric alcohol and a straight chain dicarboxylic acid having four or more methylene groups compatible therewith as a plasticizer for said polyvinyl acetal resin, and a compatible ester of phthalic acid.

4. Laminated safety glass comprising two sheets of glass and an interlayer of plastic bonded therebetween which comprises a polyvinyl acetal resin formed by the reaction of a saturated aldehyde on a hydrolyzed polyvinl ester in which approximately sixty-five percent of the available hydroxyl groups of said hydrolysis product have been reacted with the aldehyde, and a straight chain dicarboxylic acid having four to six methylene groups esterified with a monohydric alcohol having one to two carbon atoms as plasticizer for said polyvinyl acetal resin.

5. Laminated safety glass comprising two sheets of glass and an interlayer of plastic bonded therebetween which comprises a polyvinyl acetal resin formed by the reaction of a saturated aldehyde on a hydrolyzed polyvinl ester in which approximately sixty-five percent of the available hydroxyl groups of said hydrolysis product have been reacted with the aldehyde, a straight chain dicarboxylic acid having four to six methylene groups esterified with a monohydric alcohol having one to two carbon atoms as plasticizer for said polyvinyl acetal resin, and a compatible diluent plasticizer therefor.

6. Laminated safety glass comprising two sheets of glass and an interlayer of plastic bonded therebetween which comprises a polyvinyl acetal resin formed by the reaction of a saturated aldehyde on a hydrolyzed polyvinyl ester in which approximately sixty-five percent of the available hydroxyl groups of said hydrolysis product have been reacted with the aldehyde, a straight chain dicarboxylic acid having four to six methylene groups esterified with a monohydric alcohol having one to two carbon atoms as plasticizer for said polyvinyl acetal resin, and a compatible ester of phthalic acid.

7. Laminated safety glass comprising two sheets of glass and an interlayer of plastic bonded therebetween which comprises a polyvinyl acetal resin formed by the reaction of a saturated aldehyde having more than one carbon atom on a hydrolyzed polymerized vinyl ester in which approximately sixty-five percent of the available hydroxyl groups of said hydrolysis product have been reacted with the aldehyde, and an ester of monohydric alcohol and a straight chain dicarboxylic acid having four or more methylene groups compatible therewith as a plasticizer for said polyvinyl acetal resin.

8. Laminated safety glass comprising two sheets of glass and an interlayer of plastic bonded therebetween which comprises a polyvinyl acetal resin formed by the reaction of a saturated aldehyde having more than one carbon atom on a hydrolyzed polymerized vinyl ester in which approximately sixty-five percent of the available hydroxyl groups of said hydrolysis product have been reacted with the aldehyde, an ester of monohydric alcohol and a straight chain dicarboxylic acid having four or more methylene groups compatible therewith as a plasticizer for said polyvinyl acetal resin, and a compatible diluent plasticizer therefor.

9. Laminated safety glass comprising two sheets of glass and an interlayer of plastic bonded therebetween which comprises a polyvinyl acetal resin formed by the reaction of a saturated aldehyde having more than one carbon atom on a hydrolyzed polymerized vinyl ester in which approximately sixty-five percent of the available hydroxyl groups of said hydrolysis product have been reacted with the aldehyde, an ester of monohydric alcohol and a straight chain dicarboxylic acid having four or more methylene groups compatible therewith as a plasticizer for said polyvinyl acetal resin, and a compatible ester of phthalic acid.

10. Laminated safety glass comprising two sheets of glass and an interlayer of plastic bonded therebetween which comprises a polyvinyl acetal resin formed by the reaction of butyraldehyde on a hydrolyzed polyvinyl ester in which approximately sixty-five percent of the available hydroxyl groups of said hydrolysis product have been reacted with the butyraldehyde, and an ester of monohydric alcohol and a straight chain dicarboxylic acid having four or more methylene groups compatible therewith as a plasticizer for said polyvinyl acetal resin.

JOSEPH D. RYAN.